United States Patent
Schiff

(10) Patent No.: US 8,023,489 B2
(45) Date of Patent: Sep. 20, 2011

(54) BURDEN SHARING IN SATELLITE COMMUNICATIONS

(75) Inventor: Leonard Norman Schiff, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 1112 days.

(21) Appl. No.: 10/924,564

(22) Filed: Aug. 24, 2004

(65) Prior Publication Data

US 2005/0207386 A1    Sep. 22, 2005

Related U.S. Application Data

(60) Provisional application No. 60/554,307, filed on Mar. 17, 2004, provisional application No. 60/554,308, filed on Mar. 17, 2004.

(51) Int. Cl.
- *H04J 3/00* (2006.01)
- *H04J 3/16* (2006.01)
- *H04J 3/22* (2006.01)
- *H04J 3/02* (2006.01)
- *H04L 12/50* (2006.01)

(52) U.S. Cl. ......... 370/345; 370/538; 370/376; 370/465

(58) Field of Classification Search .......... 370/538, 370/316, 465, 376, 345
See application file for complete search history.

(56) References Cited

U.S. PATENT DOCUMENTS

| | | | | |
|---|---|---|---|---|
| 4,221,939 A * | 9/1980 | Cunningham et al. | ......... | 375/211 |
| 4,567,485 A * | 1/1986 | Oshima et al. | ................. | 342/358 |
| 5,461,639 A * | 10/1995 | Wheatley et al. | ............. | 370/342 |
| 6,098,124 A * | 8/2000 | Odom | ............................. | 710/52 |
| 6,240,094 B1 * | 5/2001 | Schneider | .................... | 370/412 |
| 6,320,850 B1 | 11/2001 | Perahia et al. | | |
| 6,512,929 B1 * | 1/2003 | Sandre | .......................... | 455/512 |
| 6,865,393 B1 * | 3/2005 | Baum et al. | ................. | 455/452.2 |
| 6,873,613 B1 * | 3/2005 | Dent | ............................. | 370/347 |
| 2001/0021197 A1 * | 9/2001 | Foore et al. | .................... | 370/468 |
| 2002/0003776 A1 * | 1/2002 | Gokhale et al. | ............... | 370/236 |

(Continued)

FOREIGN PATENT DOCUMENTS

JP    10075209    3/1998

(Continued)

OTHER PUBLICATIONS

OA dated Jan. 21, 2009 for Korean Application Serial No. 2006-7021557, 3 pages (English Translation).

(Continued)

*Primary Examiner* — Marisol Figueroa
(74) *Attorney, Agent, or Firm* — Turocy & Watson, LLP

(57) ABSTRACT

Systems and methods for burden sharing in satellite based communication systems are disclosed. One or more users in a satellite based communication system may experience signal degradation or signal fading that can occur for an extended period of time, such as when the fade is due to rain fade. The system can improve a communication link with a particular user by varying the data rate. The data rate can be varied by reducing a coding rate to compensate for low signal quality. In a time multiplexed communication system where multiple users time multiplex the available communication bandwidth, the system can concurrently adjust a time allocated to a user based in part on the coding rate. The time allocated to a user can be increased for decreased coding rates in order to maintain a substantially stable symbol rate to the user for each time multiplex cycle of users.

26 Claims, 8 Drawing Sheets

U.S. PATENT DOCUMENTS

| | | | |
|---|---|---|---|
| 2002/0095498 A1* | 7/2002 | Chanda et al. | 709/225 |
| 2003/0016634 A1 | 1/2003 | Freedman et al. | |
| 2003/0053432 A1* | 3/2003 | Zehavi | 370/336 |
| 2003/0128671 A1 | 7/2003 | Niesen et al. | |
| 2003/0171118 A1* | 9/2003 | Miya | 455/442 |
| 2005/0226182 A1* | 10/2005 | Itoh | 370/329 |
| 2006/0271704 A1* | 11/2006 | Chan et al. | 709/240 |
| 2007/0206525 A1* | 9/2007 | Miller et al. | 370/321 |

FOREIGN PATENT DOCUMENTS

| | | |
|---|---|---|
| JP | 2004080146 | 3/2004 |
| WO | 2004/010608 | 1/2004 |
| WO | 2004010608 | 1/2004 |

OTHER PUBLICATIONS

OA mailed Jun. 5, 2009 for Chinese Patent Application No. 200580015690.7, 12 pages.

OA mailed Oct. 31, 2007 for Korean Patent Application No. 2006-7021557, 2 pages.

OA mailed Jun. 30, 2008 for Korean Patent Application No. 2006-7021557, 3 pages.

OA mailed Jan. 21, 2009 for Korean Patent Application No. 2006-7021557, 3 pages.

OA mailed Dec. 18, 2007 for Russian Patent Application No. 2006136423/09, 1 pages.

OA mailed Aug. 18, 2009 for Japanese Patent Application No. 2007-504019, 9 pages.

Korean Office Action dated Nov. 30, 2009, for Korean Patent Application Serial No. 2009-7008083, 3 pages.

Chinese Office Action dated Dec. 18, 2009, for Chinese Patent Application Serial No. 200580015690.7, 13 pages.

Office Action mailed Feb. 22, 2010 for Indian Patent Application No. 5499/DELN/2006, 2 pages.

International Search Report mailed Aug. 19, 2005 for PCT Application No. PCT/US2005/008516, 3 pages.

Australian Office Action dated May 14, 2010, for Australian Patent Application Serial No. 2009202870, 3 pages.

Japanese Office Action dated May 25, 2010, for Japanese Patent Application Serial No. 2007-504019, 4 pages.

* cited by examiner

BURDEN SHARING IN SATELLITE COMMUNICATIONS

CROSS-REFERENCES TO RELATED APPLICATIONS

This application claims the benefit of U.S. Provisional Application No. 60/554,307, filed Mar. 17, 2004, and entitled LINK DEGRADATION COMPENSATION THROUGH CAPACITY ALLOCATION ADJUSTMENT, and U.S. Provisional Application No. 60/554,308, filed Mar. 17, 2004, and entitled RAIN BURDEN SHARING IN Ka BAND MULTI-BEAM SATELLITE DOWNLINKS, each of which is hereby incorporated herein in its entirety.

BACKGROUND OF THE DISCLOSURE

Generally, users of the Internet wanting high speed, broadband service can use DSL in many parts of the world. In areas where digital cable capability exists, cable modems provide another option. But there are large areas of the world—even the developed world—where neither option will exist for the foreseeable future. These are areas of relatively sparse population density. In those areas, lengths of cable run from telephone central offices tend to be long, thus slowing DSL speed, and, in turn, discouraging DSL deployment. Likewise the sparse population density discourages the installation of digital cable because of high cost per subscriber. It is estimated that approximately 30% of the roughly 100 million households in the US live in such areas.

Satellite service would seem to be the natural way to serve this population and, indeed, there have been several such businesses begun. Typical ventures to date have used existing Ku band satellites. These satellites have large continental sized beams rather than multiple small beams. If one wants to provide high speed service the number of subscribers that can be served per unit MHz. using large beams becomes uneconomically small. The way to fix that problem is well known. By going to a multibeam satellite, where multiple small beams cover the continent sized area rather that one big beam, one gets an effective multiplication of bandwidth. A given band of frequencies can be reused multiple times on the different beams so that the bandwidth is effectively multiplied by the number of beams divided by the reuse factor. Further, such multibeam operation effectively carries no power penalty. Comparing two different satellites with the same power, the first with one large continental sized beam and the other with multiple smaller beams covering the same area as the large beam, both satellites produce the same EIRP.

But providing multiple small beams calls for a large increase in the satellite aperture size—all other things being equal. If one considers tens of beams (say 40-60 beams) the size becomes higher than most consider practical today in Ku band. Hence one is driven to the use of Ka band—the next frequency band up from Ku reserved for FSS operation.

However, Ka band introduces its own problem—namely much higher rain degradation. To be sure rain degradation is important in Ku band as well but in most situations adequate availability is provided by using several dB of margin. In Ka band, however, 10 and more dB of rain degradation is not that rare an occurrence, and simply providing margin to overcome rain degradation seems impractical. Providing power margins of tens of dB for a rain degradation situation that may occur for less than 10% of the time is impractical and uneconomic. It is desirable to be able to consistently provide a communication link over nearly all environmental conditions without resorting to brute force application of a power margin sufficient to overcome environmental degradation.

BRIEF SUMMARY OF THE DISCLOSURE

Systems, apparatus, and methods of handling downlink traffic in an Internet access system incorporating rain burden-sharing have been disclosed. The systems and methods combine time division multiplex, variable rate coding over large dynamic range with appropriate feedback from user devices. The user devices can report a signal metric such as signal to noise ratio to a hub, such as a terrestrial gateway. The system process compensates users of lowered data rate with increased portions of time on the channel. The effects of rain burden sharing, as rain passes through a beam, is as a decrease of capacity of the beam but substantially all users receiving exactly the same quality of service.

Disclosed is a method of burden sharing in a communications channel, including buffering data corresponding to each of a plurality of users, retrieving a substantially equal number of data bits for each of the plurality of users, determining a coding rate corresponding to each of the plurality of users, coding the data bits with the coding rate corresponding to each of the plurality of users, and time multiplexing the coded bits over a wireless communication channel to the plurality of users.

Also disclosed is a method of burden sharing in a communications channel, including buffering data for a first user, retrieving at least a portion of the buffered data, determining a coding rate for the retrieved portion of buffered data, coding the retrieved portion of buffered data at the coding rate to produce encoded data, determining a time slot duration based, at least in part, on the coding rate, and time multiplexing the encoded data with data for users distinct from the first user.

In another aspect, a method of burden sharing in a communications channel, includes buffering data corresponding to a plurality of users, accessing a first buffer having stored therein data for a first user, determining a data block size of data to be retrieved from the first buffer, retrieving data corresponding to the data block size from the first buffer, determining a coding rate to be applied to retrieved data based in part on a signal metric derived from a Ka band satellite signal received by the first user, encoding the retrieved data to produce encoded data, time multiplexing the encoded data with data for other users to generate time multiplexed data, and transmitting the time multiplexed data to a satellite configured to transmit a Ka band forward link signal to the first user in one of a plurality of satellite beams.

In still another aspect, the disclosure includes an apparatus for burden sharing in a communications channel including a plurality of buffers, each buffer configured to store data for a corresponding one of a plurality of users, a coder configured to retrieve data corresponding to a nominal data block size from each of the plurality of buffers in a time multiplexed manner, and encode the data with one of a plurality of coding rates based on a control signal to produce time multiplexed encoded data, a rate control module coupled to the coder and configured to receive a signal metric from each of the plurality of users and generate, based on the received signal metric, the control signal for the coder.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Systems, apparatus, and methods for implementing rain burden-sharing are disclosed. Rain burden sharing systems are capable of providing high availability, high speed service on the downlinks of Ka band satellites with almost no margin.

A communication system can implement burden sharing in a system where multiple users are time division multiplexed over a communication channel. The system can be configured to vary a code rate of the data for each of the users. The system can be configured to vary the code rate by an amount sufficient to provide a predetermined amount of coding gain.

The system adjusts the coding rate for a particular user based on a signal quality experienced by the user. To counter the adverse effects of increased coding gain on the data rate experienced by the user, the system can also be configured to vary the duration of a time slot allocated to each user. The system can thus allocate a time slot duration in a manner that is inversely proportional to the coding gain applied to the channel. That is, the system can allocate a time slot duration that is linearly proportional to the inverse of the coding rate. Because the channel is shared by all time multiplexed users, the increased duration allocated to any particular user slightly decreases the performance of all other users. Thus, the degradation in performance by one user is effectively compensated by the other users, such that the aggregate change in performance experienced by all of the time multiplexed user of the channel is minimal.

Figure 1A:
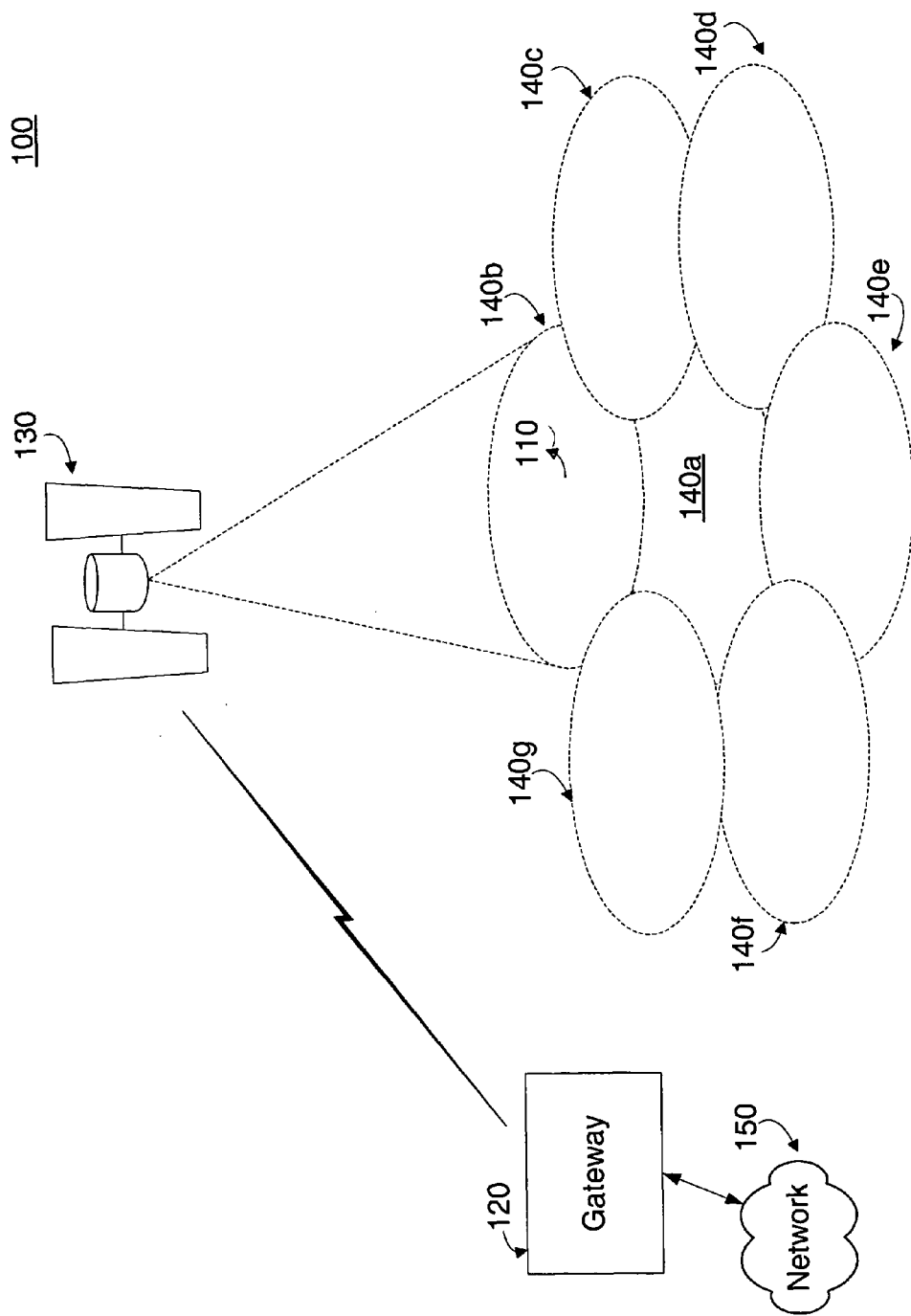
FIG. 1A is a functional block diagram of an embodiment of a wireless communication system implementing burden sharing.

FIG. 1A is a functional block diagram of an embodiment of a satellite communication system 100 configured to provide burden sharing. The satellite communication system 100 includes a terrestrial base station, here referred to as a gateway 120. The gateway 120 can provide an interface to a network 150 which may be external to the satellite communication system 100. The interface between the gateway 120 and the network 150 can include wired links as well as wireless links. The network 150 can be, for example, a Local Area Network (LAN) or a Wide Area Network (WAN) such as the Internet.

The gateway 120 is also configured to interface with a satellite 130. In some embodiments, the gateway 120 may be configured to interface with multiple satellites. The gateway 120 communicates with the satellite 130 over a communication link in a first communication band. The first communication band may be, for example, Ka band, Ku band, S band, L band, or some other communication band.

The source (not shown) coupled to the network 150 can provide information to the gateway 120 to be relayed to a user device 110. The gateway 120 communicates information over a first forward link channel to the satellite 130 and the satellite 130 relays the information over a second forward link channel to the user device 110.

The satellite 130 can be configured to have one or more beams, with each beam illuminating a corresponding region 140a-140g. FIG. 1A shows multiple regions 140a-140g supported by the satellite 130, but only illustrates one beam for purposes of clarity.

The satellite 130 can be configured to relay the forward link information to the user device 110 positioned within one of the regions 140b. The forward link communication from the satellite 130 to the user device 110 can be, for example, within the Ka or Ku band, or some other allocated portion of the frequency spectrum.

The user device 110 can be, for example, a computer, server, terminal, phone, personal digital assistant, and the like, or some other communication device. The user device 110 can be stationary or may be mobile and capable of moving between the regions 140a-140g.

The user device 110 can communicate with a device (not shown) coupled to the network 150 over a reverse link channel that couples the user device 110 to the gateway 120 via the satellite. The user device 110 may generate data, receive input data, or receive data from an external device (not shown) and can transmit the information to the satellite 130 using a reverse link channel within an allocated frequency band, which may be, for example, within the Ka or Ku bands. The user device 110 may communicate with the satellite using an internal transceiver. However, in more typical scenarios, the transceiver is positioned in a small earth station (not shown) that is external to the user device 110. The user device 110 may communicate with the transceiver using, for example, a wired link, and the transceiver may communicate directly with the satellite 130. The satellite 130 in turn relays the reverse link signal to the gateway 120.

The satellite communication system 100 can allocate substantially the same bandwidth to the forward and reverse links, or may allocate different bandwidths to the two links. For example, applications such as Internet access may be characterized as largely dominated by forward link communications, with a relatively low amount of reverse link information. In such systems, the forward link may be allocated a larger bandwidth than the reverse link.

The gateway 120 and satellite 130 can be configured to concurrently support multiple user devices 110 positioned within the regions 140a-140g. At any given time, a user device, for example 110, within a region 140b may experience a signal fade that is attributable to an environmental condition, such as rain. However, other user devices (not shown) may not be affected by the same rain fade, and may experience completely different environmental conditions.

The gateway 120 can continue to support communications to the user devices, including any user device 110 affected by a rain fade, by varying a coding rate of the information supplied to the user device 110 experiencing the fade. The gateway 120 can simultaneously share the fade burden across multiple users by allocating a larger time for transmission of the information to the user device 110 experiencing the fade. By sharing the burden among all users and using different coding gains, the power margin required of the satellite 130 can be optimized.

A satellite communication system 100 that is configured to provide support for communication to a network, such as the Internet, can include a downlink that is time division multiplexed with different time segments addressed to the various subscribers receiving from the given channel. The time segments may consist of IP packets or sub-portions of those packets. The term "time division multiplexed" is not mean to imply any fixed relationship amongst the time slots. Instead, the time slots can be long or short and addressable to different subscribers in a freely intermixed way.

The power of each channel can be configured to be held constant except when the transmit queue is empty, when zero or low power is transmitted. Transmitting at full power when there is no traffic to transmit (for example, by transmitting dummy characters) would be to create unnecessary interference to other beams that are reusing this frequency. In order to cope with the effects of rain degradation the code rate is varied.

The satellite communication system 100 uses a variable rate to cope with rain by implementing an automatic shifting of code rate to cope with degradation. Advantageously, the code rate variations are large enough to create a very large dynamic range of coding gain.

The automatic shifting of code rate is ensured by continuously monitoring a signal metric, such as a signal to noise ratio (SNR), at the user device 110 and periodically signaling this information back to gateway 120 over the reverse link. The gateway uses the signal metric to allow it to determine the highest coding rate, corresponding to the lowest coding overhead, that will ensure meeting the error rate requirements.

The user device 110 can be configured to periodically determine the signal metric from the forward link data and can return the signal metric to the gateway 120. The signal metric is not limited to SNR, but may be any signal metric correlating with a quality of service. For example, the signal metric may be a data error rate, such as a symbol error rate or a bit error rate.

It may be preferable to minimize the amount of information provided in the signal metric, because communicating the signal metric over the reverse link channel consumes a portion of the available reverse link bandwidth. However, the signal metric is preferably communicated with a period sufficient to compensate for expected variations environmental effects.

Figure 1B:
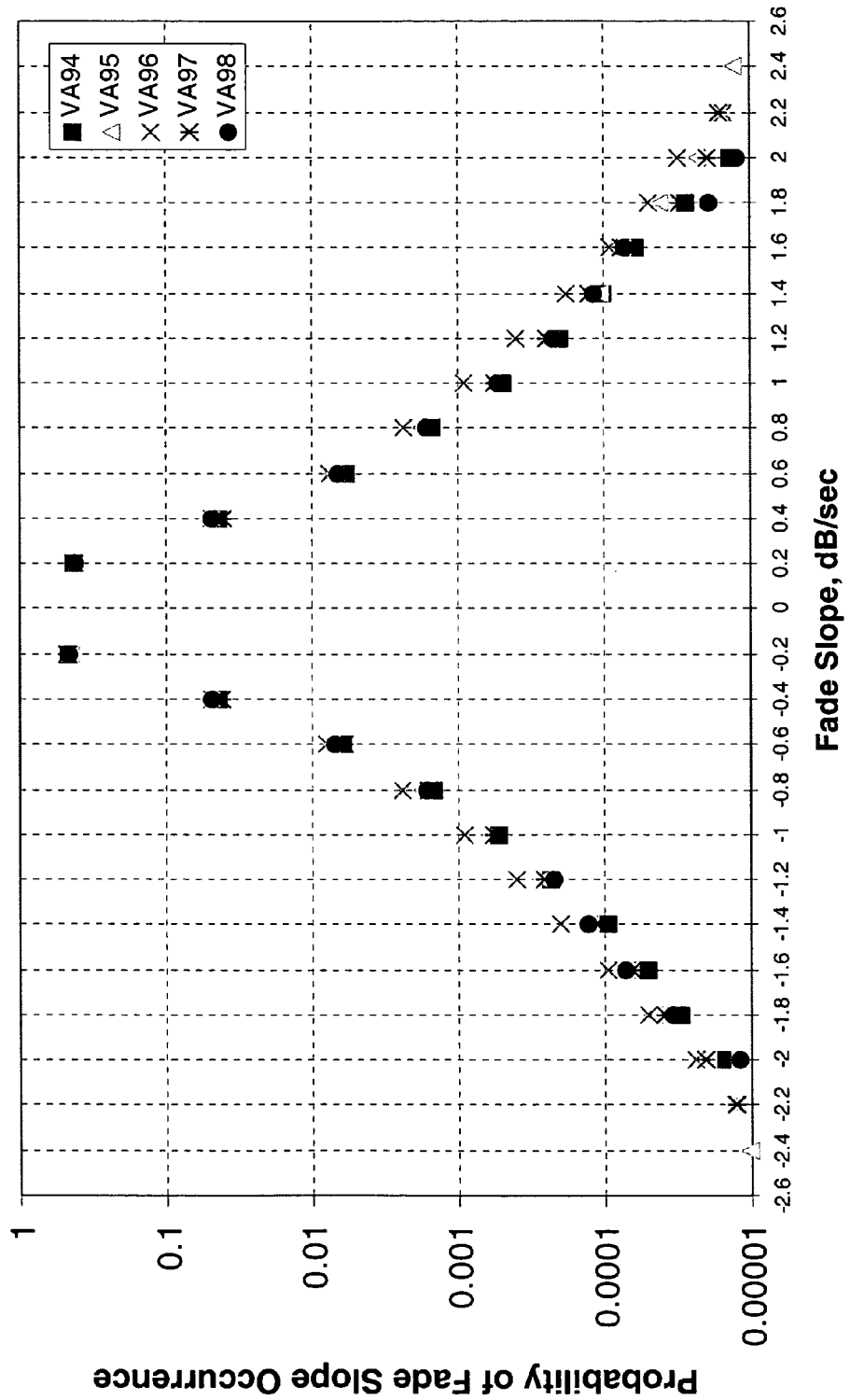
FIG. 1B is a graph of fade slope statistics.

FIG. 1B shows a graph of rain fade slope statistics. The data is derived from 5 years worth of data measuring rain degradation in Reston Va., USA on an receiver operating at 20 GHz. The statistics can represent the rain fade statistics experienced by a user device 110 in the satellite communication system 100 of FIG. 1A when the forward link signal from the satellite 130 to the user device 110 is approximately 20 GHz.

The graph shows that the rain fade slope (in dB/sec.) is sufficiently small such that the signal metric information can be sent at a period of approximately every ½ second. Using this update period, the probability is high that the signal metric is accurate to a margin of less than a dB. The signal metric may be inaccurate due to "staleness" of information caused by the signal degradation changing over the round trip time for reporting the signal metric and varying the code rate. Using SNR as the signal metric and an update period of approximately ½ second, the probability of error due to lower SNR than expected in the time slot is exceedingly small.

In practice it can be advantageous to allow a few tenths of a dB to the margin to allow for error in the signal metric determination, for example, errors in the SNR measurement. But overall a margin of approximately 1 dB will suffice and that is ordinarily a sufficient margin in the satellite communication system 100.

As pointed out above, the satellite communication system 100 may need to provide a large dynamic range of code rate to provide high availability. The gateway 120 can be configured, for example, to provide a 15 db range of coding gain. However, once code rates go below 0.2 or 0.25, it may be more efficient for the system to perform symbol repetition. A system incorporating symbol repetition trades off longer slot time for lower SNR in a simple proportional way. However, varying the coding gain by varying coding rates higher than 0.2 may be more efficient than symbol repetition. The user device 110 may experience a range of instantaneous data rate (as distinct from code rate) that is quite large. Although the data rate variation is typically smaller than the 15 dB range in coding rate gain.

Changing the coding gain provides a high level of availability. However, the data rate slows dramatically during the heaviest rains because of the increase in the coding gain. As discussed earlier, the satellite communication system 100 implements rain burden-sharing to prevent any single user from experiencing a dramatic decrease in quality of service.

The satellite communication system 100, in particular the gateway 120 that unloads the transmit queue for link transmission, increases a users time slot in proportion to the reduction in data rate. If a user not degraded by rain were assigned a time slot of length T, that same user, if rate reduced by a factor $\beta$ can be allocated a time slot expanded to a duration $\beta T$.

To understand the effect this has on the users within the system, recall that the forward channel is time-shared and is shared by many users. The channel can be configured to transmit at several tens of Mbps in the absence of rain. Ordinarily, no one user ever takes up but a small percentage of the time on the link. A user that experiences a tenfold diminution in data rate and a tenfold increase in slot length does not experience any change in performance, as perceived by the user. The satellite communication system 100 relies on the probability that only a small percentage of the users in any satellite beam are experiencing hard rain at any one moment in time.

Consider the following hypothetical example. Assume that 99% of the users of a channel in a beam are unaffected by rain and assume that 1% of them are degraded enough by rain to require a tenfold increase in slot time. This difference in slot time can correspond to degradation that is actually greater than 10 dB because coding gain is not a linear function of coding rate. This 1% of the users in the burden sharing system thus are configured to put a load on the system equivalent to what 10% of the users would if they were not affected by rain.

Because the rain affected users are made whole by the expansion of their time slots all users experience substantially the same speed of service, but the system response performs like a system without rain but with approximately 10% more users (actually 9=10−1%). An equivalent way to look at it is that the users all have the same service and that effectively the capacity of the beam is reduced by 10%. So rain burden-sharing works by having users who are relatively unaffected by rain give up capability for the benefit of those who are adversely affected by rain so that all subscribers will get substantially the same speed of service. They give up that capability through the reduction in beam capacity that occurs when rain moves through the beam. Typically, only a relatively small minority of users is very adversely affected by rain at any instant in time—that is, high rain is very localized and the higher the rain the smaller the area.

With the rain burden-sharing method of operation all users get substantially the same speed of service, but they share service on a beam or channel that has fluctuations in its capacity. If rain degradation exceeds the maximum of the range, service to some users may cease. As rain passes through the beam the aggregate capacity will degrade but, typically, not very much.

This fluctuation in service is the kind of service experienced and expected of Internet access. Internet access is, by its very nature, a "best efforts" kind of service. Users may experience delays due to congestion at the servers they address or due to congestion in the intervening links between client and server. The added delay associated with rain passing through the beam and the attendant reduction in capacity is just one additional source of sporadic delay and hard for any particular user to discern in the usual variation of delay in completing transactions.

Figure 2:
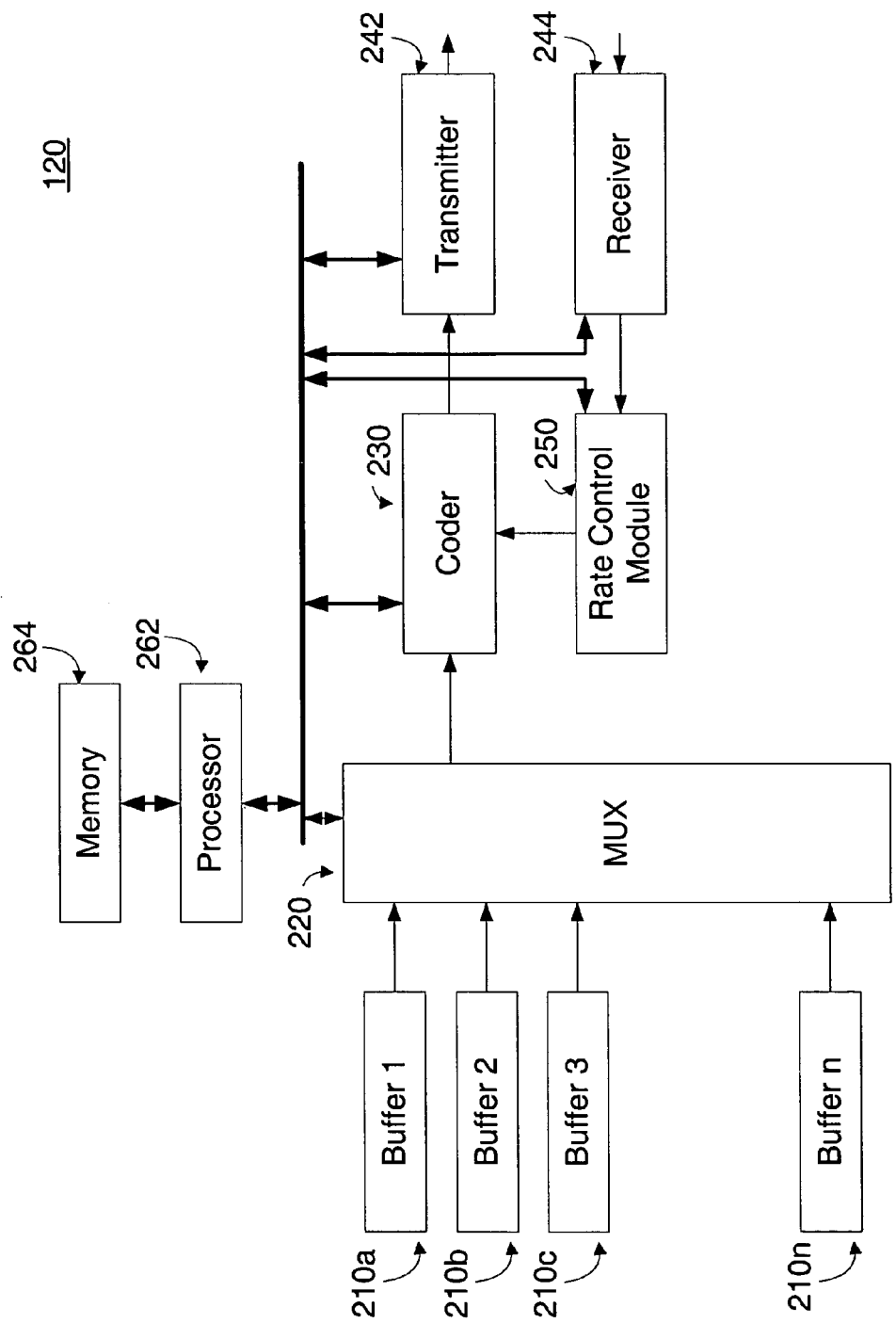
FIG. 2 is a functional block diagram of an embodiment of a satellite gateway configured for burden sharing.

FIG. 2 is a functional block diagram of an embodiment of a gateway 120, which may be implemented as the gateway 120 in the satellite communication system 100 of FIG. 1A. The gateway 120 is configured to implement in the forward link channel the rain burden sharing and associated code rate variation as discussed above.

The gateway 120 includes multiple buffers 210a-210n that are configured to store the forward link data that is to be delivered to the user devices. In one embodiment, the gateway 120 dynamically assigns a buffer, for example 210a, to each user device for which a communication link is established and for which data is to be queued. Thus, the gateway 120 may allocate and remove buffers 210a-210n as user devices connect or disconnect from a network or remote device via the gateway 120. The gateway 120 can allocate a constant amount of space within each of the buffers 210a-210n, or may allocate space based on the amount of information that is queued for delivery.

The gateway 120 can time multiplex the buffers 210a-210n, and thus access to the forward link communication channel, according to a predetermined time multiplex process or method. In one embodiment, the gateway 120 may be configured to successively provide access to the forward link channel in a round robin manner. In other embodiments, the user devices may be assigned a priority and the gateway 120 may provide access to the forward link communication channel based in part on the priority. For example, a first user device associated with a first buffer 210a may be assigned a higher priority than a second user device associated with a second buffer 210b and a third user associated with a third buffer 210c. The gateway 120 may be configured to retrieve data from the first buffer 210a and provide the first user device access to the forward link channel more often than the second or third user devices. For example, the gateway 120 may be configured to access the first buffer 210a, the second buffer 210b, followed by the first buffer 210a again prior to accessing the third buffer 210c. The gateway 120 can also implement some other time multiplexing process or method.

The gateway 120 includes a multiplexer 220 that can be controlled to selectively couple one of the buffers 210a-210n. The output of the multiplexer 220 is coupled to a coder 230 that can be configured to encode the selected buffer data using one of a plurality of code rates. Preferably, the coder 230 is configured to have a selection of code rates to provide a range of coding gain sufficient to compensate for an anticipated range of degradation or fade in the link. The coder 230 may optionally be configured to provide symbol repetition as an alternative to applying a low coding rate. The output of the coder 230 is coupled to a transmitter 242 that is configured to transmit the forward link signals to a satellite for delivery to a corresponding user device in a region illuminated by a satellite beam.

The gateway 120 also includes a receiver 244 that is configured to receive reverse link signals relayed by the satellite. Each of the user devices in communication with the gateway 120 can determine a signal metric, such as a SNR, and can transmit the signal metric on a reverse link channel back to the gateway 120 via the satellite.

The receiver 244 can be configured to demodulate the signal metric and provide it to a rate control module 250. The rate control module 250 can be configured to determine the appropriate code rate based in part on the signal metric. The rate control module 250 can be configured to provide an appropriate control signal or message to the coder 230 to configure the coder 230 to encode the data with the appropriate code rate. The receiver 244 may also be configured to couple reverse link data to a destination device. However, such reverse link processing is not shown in FIG. 2 for the sake of clarity.

The gateway 120 can also include a processor 262 coupled to memory 264. The memory 264 can include one or more storage devices and can be configured to store processor readable instructions in the form of software. The processor 262 can be configured to access the memory 264 and execute the software.

The processor 262 in conjunction with the memory 264 can execute the processes that control the time multiplexing of the buffer data. Additionally, the processor 262 and memory 264 can be configured to perform some or all of the functions of some of the other modules, including, but not limited to, the buffers 210a-210n, the multiplexer 220, the coder 230, and the rate control module 250.

In an example of an embodiment of the gateway 120 of FIG. 2, the n buffers 210-210n can be configured to store data that is to be delivered over the forward link to n corresponding user devices operating within one or more regions supported by satellites that are in communication with the gateway 120. The gateway 120 accesses the buffers 210a-210n in around robin fashion, accessing each buffer at least once before accessing another buffer a second time.

The gateway 120 is configured to receive at the receiver 244 a signal metric from a first user device over a reverse link channel. The signal metric can be, for example, a SNR of the forward link signal determined at the user device. The receiver 244 can couple the signal metric to the rate control module 250. The rate control module 250 can determine a corresponding code rate to be applied to the next time slot of forward link data transmitted to the first user device. In one embodiment, the rate control module 250 can include a look up table of code rates and the range of SNR corresponding to each of the code rates.

The multiplexer 220 can be configured to couple a first buffer 210a to a coder 230. The coder 230 can be configured, based on the previously received signal metric, to encode the data with one of a plurality of code rates. The multiplexer 220 can also be configured to continue to couple the first buffer 210a to the coder 230 for a time period that depends, at least in part, on the coding rate applied by the coder 230. Thus, if the coder 230 is configured to provide a code rate that is approximately one half of a nominal code rate, the multiplexer 220 can be configured to couple the first buffer 210a to the coder 230 for approximately twice a nominal time slot duration. In general, the multiplexer 220 can be configured to allocate a time slot duration equal to a nominal time slot duration scaled inversely proportional to a code rate applied during the time slot.

The multiplexer 220 can be configured to provide access for the allocated time duration by synchronizing access according to some time reference. In another embodiment, the multiplexer 220 can provide access for a predetermined number of bits or symbols stored in the buffer, for example 210a. Thus, if the coder 230 retrieves x-number of bits, the time needed to transmit x-number of bits is approximately proportional to the code rate, regardless of the code rate. The time may be directly proportional to the coding rate or may be approximately proportional because of possible overhead bits or because of the particular structure of the code.

The time slot duration is only approximately determined according to the associated code rate. The processor 262 may configure the multiplexer 220 to provide continued access to a particular buffer, for example 210*a*, if the buffer 210*a* is nearly empty and the remaining data in the buffer 210*a* is less than some predetermined fraction of bits or symbols in a nominal time slot. In other situations, the time slot may be shorter than an integer multiple of the nominal time slot duration if the buffer stores less bits or symbols than are required to fill a time slot. Alternatively, the processor 262 may configure the multiplexer 220 to provide less than an integer multiple of a nominal time slot duration in order to allow transmission of overhead bits.

Therefore, in the condition where only a single user, for example associated with the first buffer 210*a*, is experiencing a rain fade, the gateway 120 can be configured to successively provide access to each of the buffers 210*b*-210*n* for a nominal time slot duration and provide access to the first buffer 210*a* for a longer duration that is determined in part on a received signal metric.

Figure 3:
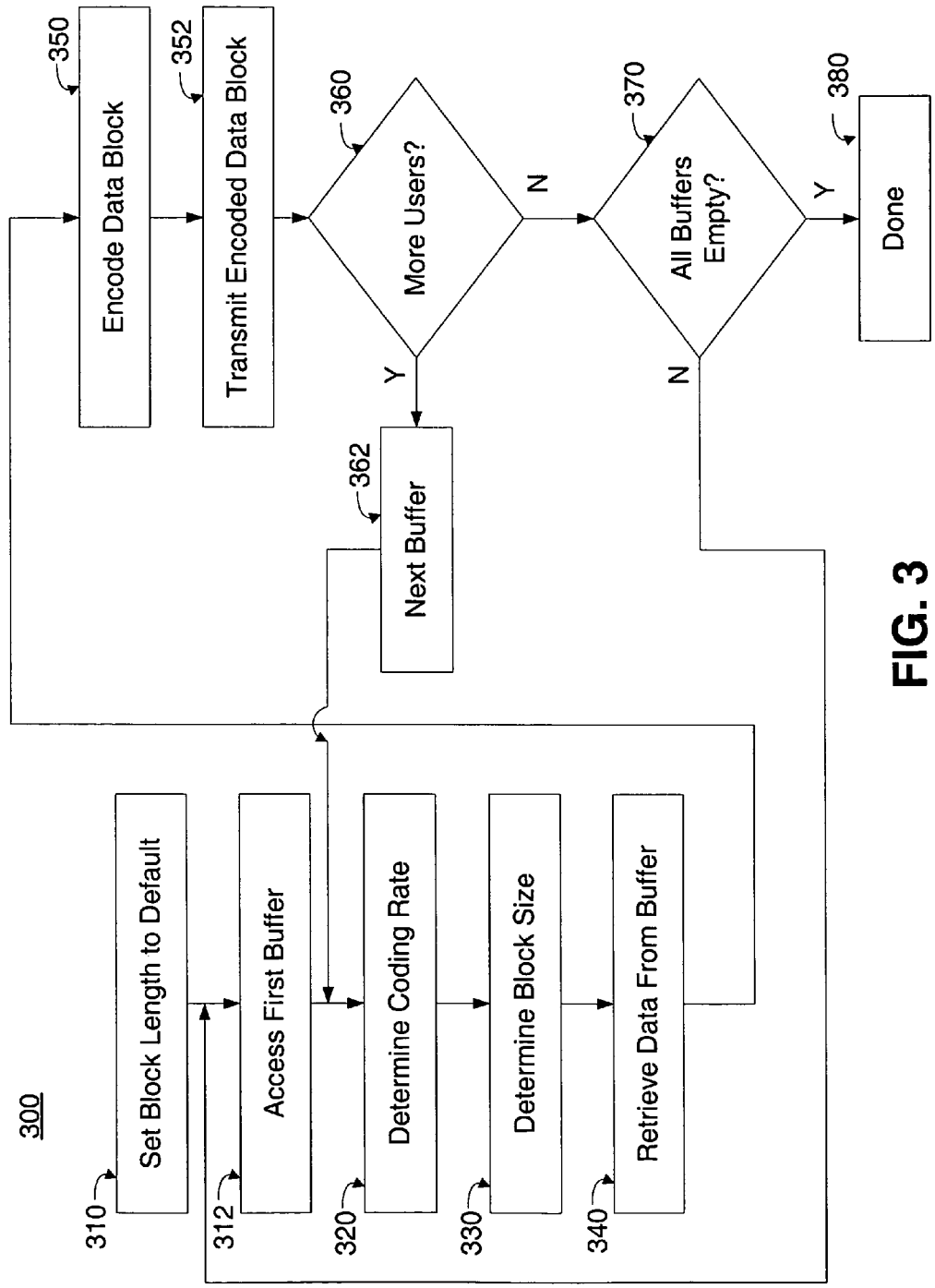
FIG. 3 is a flowchart of an embodiment of a process for burden sharing.

FIG. 3 is a flowchart of an embodiment of a process 300 for burden sharing in a time multiplexed communication channel. The process 300 can be performed, for example, by the gateway 120 shown in FIG. 1A or FIG. 2.

The process 300 begins at block 310 where the gateway using, for example, the processor and memory in conjunction with the multiplexer, sets a data block length to a default data block length. The default data block length corresponds to the nominal number of bits or symbols that are retrieved from each of the buffers. The default data block length also corresponds to a nominal time slot, based on a nominal code rate.

After the nominal data block number is set, the gateway next accesses the first buffer 312. The multiplexer can be configured to couple the first buffer to the coder. The gateway, in block 320, determines the coding rate to be applied to the data from the first buffer. If the data represents the initial forward link data transmitted to the associated user device, the gateway may select a nominal coding rate. Alternatively, if the gateway has already received a signal metric from the first user device, the gateway may determine the code rate based on the received signal metric.

After determining the signal metric, the gateway proceeds to block 330 and determines the actual data block size to be transmitted. As discussed above, the actual data block size may vary from the nominal data block size due to overhead bits or buffer contents.

The gateway proceeds to block 340 and retrieves the data sufficient to populate the previously determined data block size. The coder can, for example, retrieve the data from the buffer at some rate that is much higher than a transmit data rate, such that the data block can be coded prior to the time slot allocated to the coded data.

The gateway proceeds to block 350 and, with the coder, encodes the data block using the code and code rate determined in previous process steps. After encoding the data block, the gateway proceeds to block 352 and transmits the encoded data block to the satellite using the transmitter. The satellite, in turn, transmits the encoded data block to the associated user device.

The gateway proceeds to decision block 360 to determine if there are more users with queued data. If so, the gateway proceeds to block 362 and accesses the next buffer assigned to a user device. The gateway then returns to block 320 and processes the data stored in the buffer.

Returning to decision block 360, if the gateway determines that all of the users have been accessed, that is, the gateway determines that all buffers have been accessed, the gateway proceeds to decision block 370.

In decision block 370, the gateway determines if all of the buffers are empty. That is, the gateway determines if there is any additional data queued in any of the buffers. if so, the gateway proceeds to block 380 and the process 300 is done.

Returning to decision block 370, if not all buffers are empty, the gateway returns to block 312 and accesses the first buffer. Because the user devices accessing the system may change and some buffers may empty, the number of buffers and the user devices associated with each buffer may change for each loop of the process 300.

Figure 4:
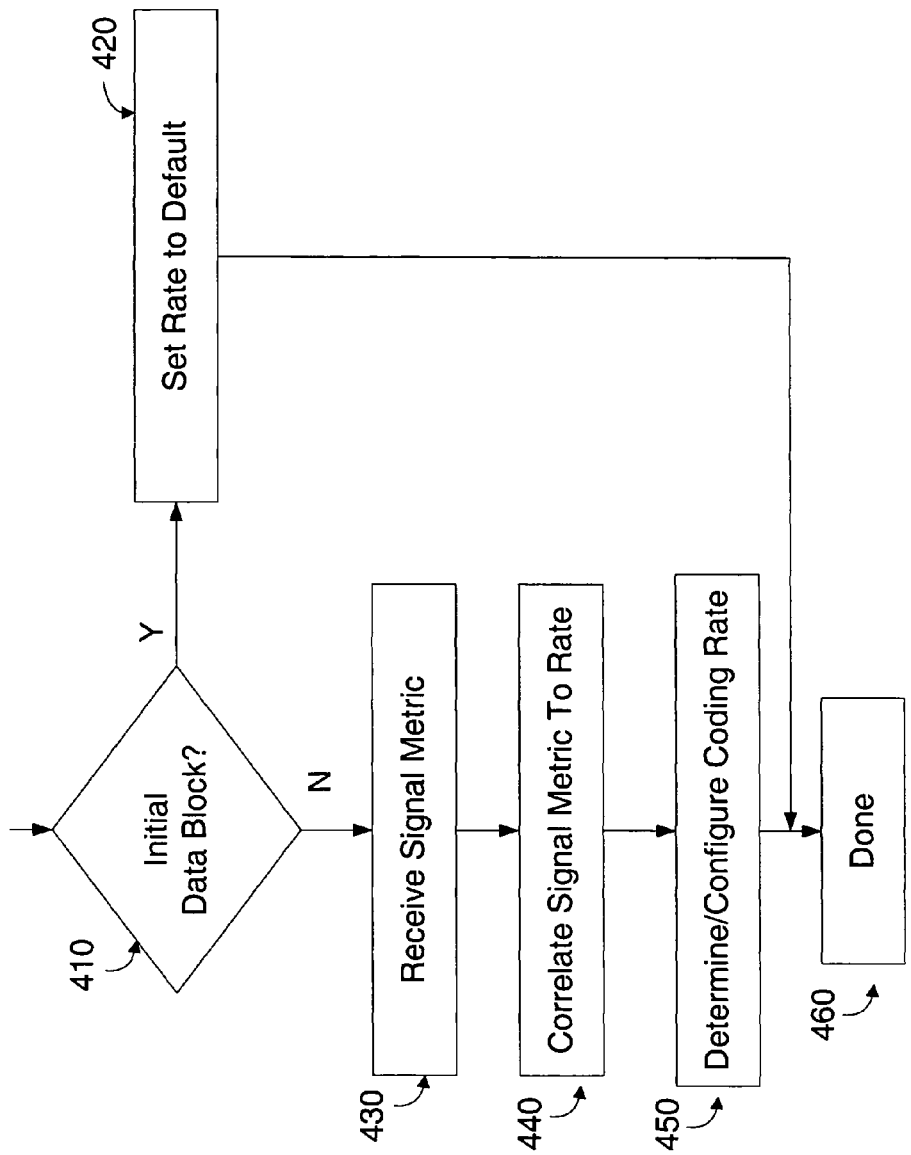
FIG. 4 is a flowchart of an embodiment of a process for determining a coding rate in a burden sharing system.

FIG. 4 is a flowchart of an embodiment of a process 320 for determining coding rate, such as shown in the flowchart of FIG. 3 or performed in the gateway of FIG. 1A or FIG. 2. The process begins at decision block 410 where the gateway, for example in the rate control module, determines if the data block represents the initial data block transmitted to the user device. If so, the gateway proceeds to block 420 and sets the coding rate to the default or nominal code rate. The gateway then proceeds to block 460 and is done.

Returning to decision block 410, if the gateway determines that the data block does not represent the initial data block transmitted to the user terminal, the gateway proceeds to block 430 and receives the signal metric. For example, the receiver in the gateway may receive a SNR from the user terminal over a reverse link channel and use the SNR as the signal metric.

The gateway proceeds to block 440 and correlates the signal metric to a coding rate. For example, the rate control module may store a look up table of available code rates and the SNR values corresponding to each of the code rates. The rate control module can the determine the code rate by using the look up table and received SNR value. Alternatively, the rate control module can be configured to calculate a code rate based on a received bit error rate from the user device. The rate control module may then round the code rate to the nearest code rate from a plurality of available code rates. In other embodiments, the rate control module may correlate the signal metric to a code rate using some other technique.

The gateway then proceeds to block 450 and determines the code rate and configures the coder to apply the code rate to the data. The rate control module can, for example, determine the code rate based on a look up table and generate one or more control signals or messages that are coupled to the coder to configure the coder to apply the desired code rate. The gateway then proceeds to block 460 and is done.

An example of a Ka band rain burden sharing network implementation can be analyzed using presently available rain data. In the example, the source of data for how rain is distributed over a beam area is the U.S. National Weather Service (NWS). The NWS maintains a string of weather radar stations across the continental United States (CONUS). Every 15 minutes a full 360 degree scan is made by each radar and the rain rates (as a function of range) are estimated from the reflectivity data. The rainfall product data provided by the NWS gives a snapshot of rain across CONUS every 15 minutes in the form of a 459×915 pixel grid in which each pixel represents an 8 km.×8 km. area. In each pixel the rain rate is quantized to a series of data bins of value going from 0 mm/hr to over 150 mm/hr. The NWS stores this data every 15 minutes and it is catalogued and available on request. There are similar facilities across Western Europe.

To calculate the capacity reduction one can consider a subset of pixels from CONUS to constitute a beam. A system model can position one user device at the center of each such pixel as representing a uniform distribution of subscribers. For each such subscriber one can calculate the path from the user to a geostationary satellite at a fixed slot location. At each multiple of the 15 minute interval one may determine the rain attenuation of each such subscriber by using standard International Telecommunications Union (ITU) models relating attenuation to the rain rates for all the pixels the path passes through. For simplicity the rain is assumed to be constant as a function of height for each pixel up to the maximum height given in the ITU model.

Once rain attenuation is determined, the rise in noise temperature for each subscriber can be determined. The effects of the attenuation and noise temperature rise can be summed to give the total path degradation for each subscriber. If the degradation exceeds the compensation dynamic range (15 dB in the example below) then that user is considered out of service or unavailable at this time and is not included in the calculation. In this simplified example we have assumed that the reduction in data rate is proportional to the degradation (e.g., 10 dB of degradation would produce 1/10th the data rate). Hence the data rate for each available user is known and the capacity can be computed as the average data rate amongst all the available subscribers in the beam. Note, however, that the average is not the arithmetic mean but rather the harmonic mean (i.e., find the average value of the reciprocal of data rate and then take the reciprocal of the average). The arithmetic mean is the average beam data rate if all users are allowed to transmit at the rate the rain allows them for the same length of time. The harmonic mean is the average beam data rate if all users transmit at the rate the rain allows them and each user transmits the same number of bytes of data. It is the latter case that applies here where the time slot time is expanded to compensate for decreased rate. The harmonic mean is always less than the arithmetic mean.

This calculation is approximate, of course. Of the two major simplifying assumptions, one tends to give a more optimistic result while the other produces a more pessimistic result. The model assumes that the rain rate is constant along the portion of the path traversing a given pixel (below the height at which rain cuts off) whereas it actually varies along that portion of the path. Because rain degradation (in dB/km) is a convex function of rain rate the total degradation along a path on which rain rate varies is greater than the degradation resulting from a path on which the rain is constant and equal to the average rain rate on the path—hence optimistic in this regard. However the analysis also assumes that the data rate is reduced in exact proportion to the degradation and that is pessimistic in that it ignores the coding gain that occurs at higher code rates.

Figure 5:
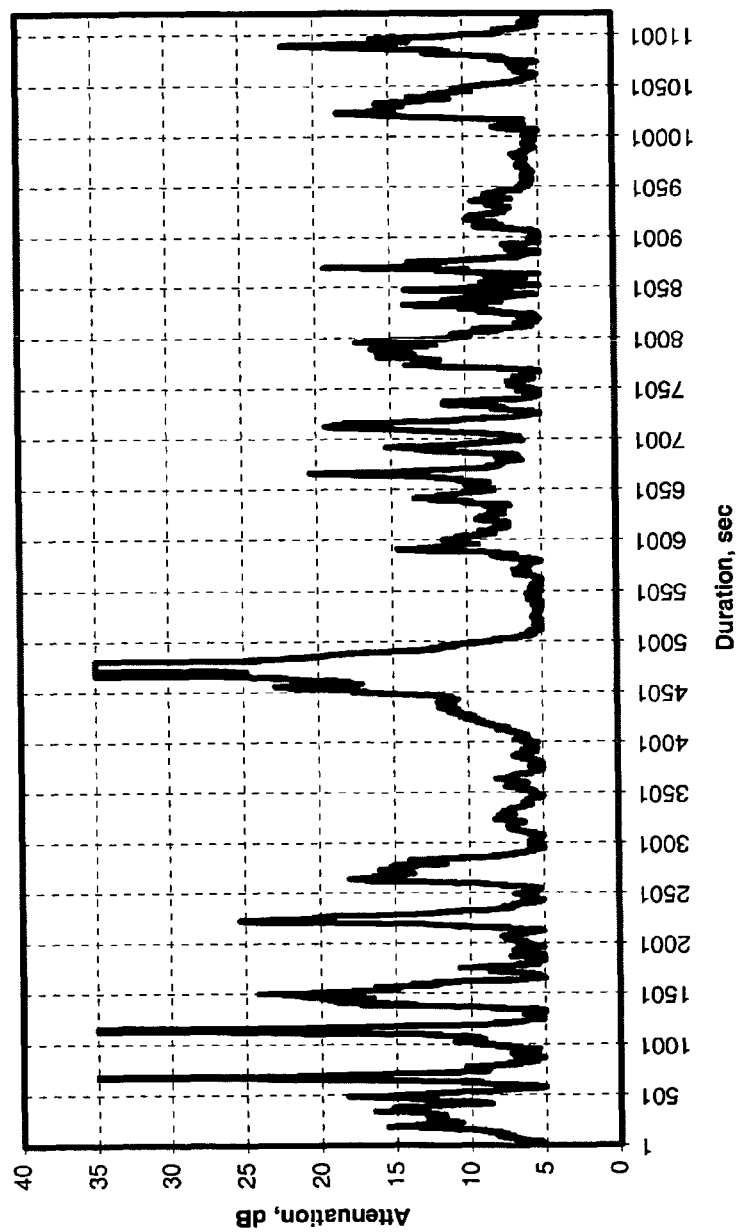
FIG. 5 is a graph of measured rain attenuation.

In the example below a beam size roughly 1/60th the area of CONUS boresighted on Reston, Va. Reston was picked because there are 5 years worth of statistics for the rain attenuation there from the ACTS experiments. Our goal was to examine the beam capacity variations in the several hour period around the worst attenuation period we could find. The attenuation for the period of study is shown in FIG. 5.

Figure 6:
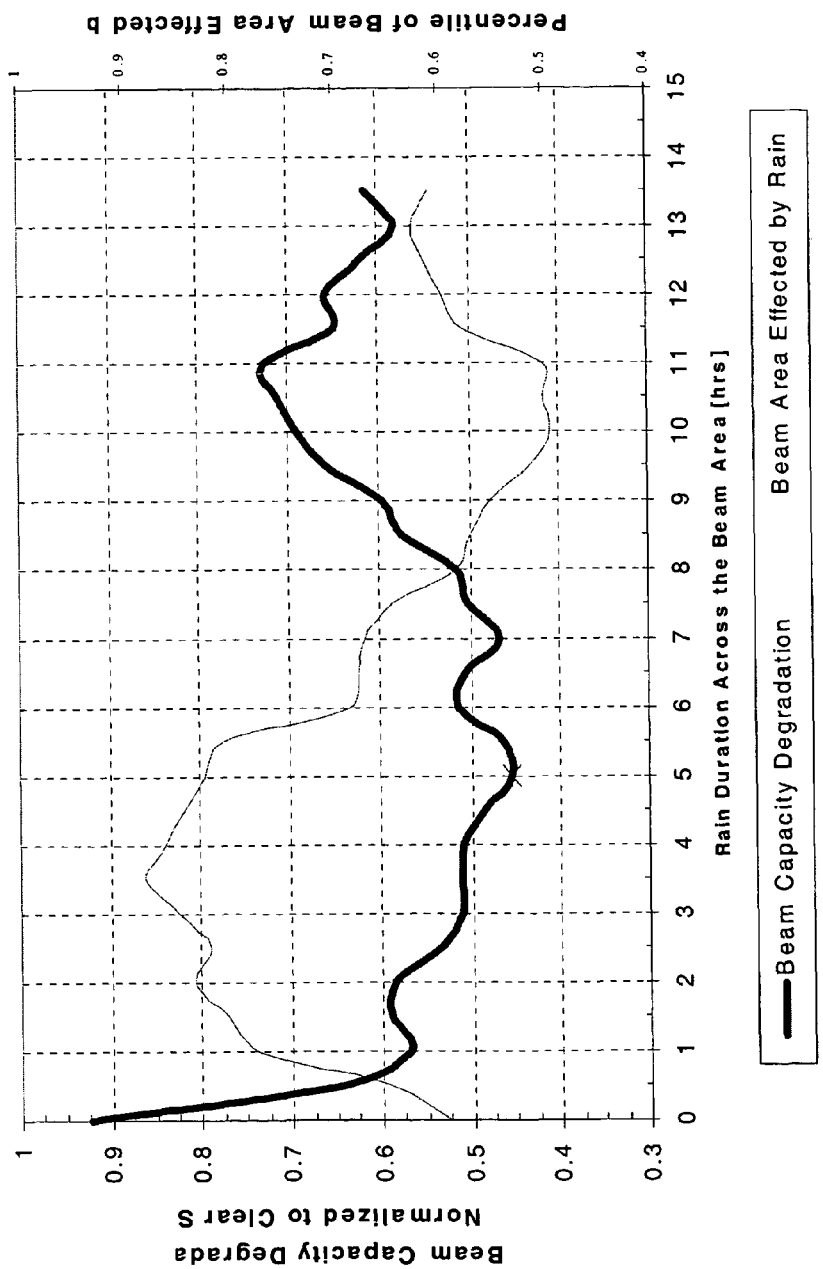
FIG. 6 is a graph of beam capacity variations.
Figure 7:
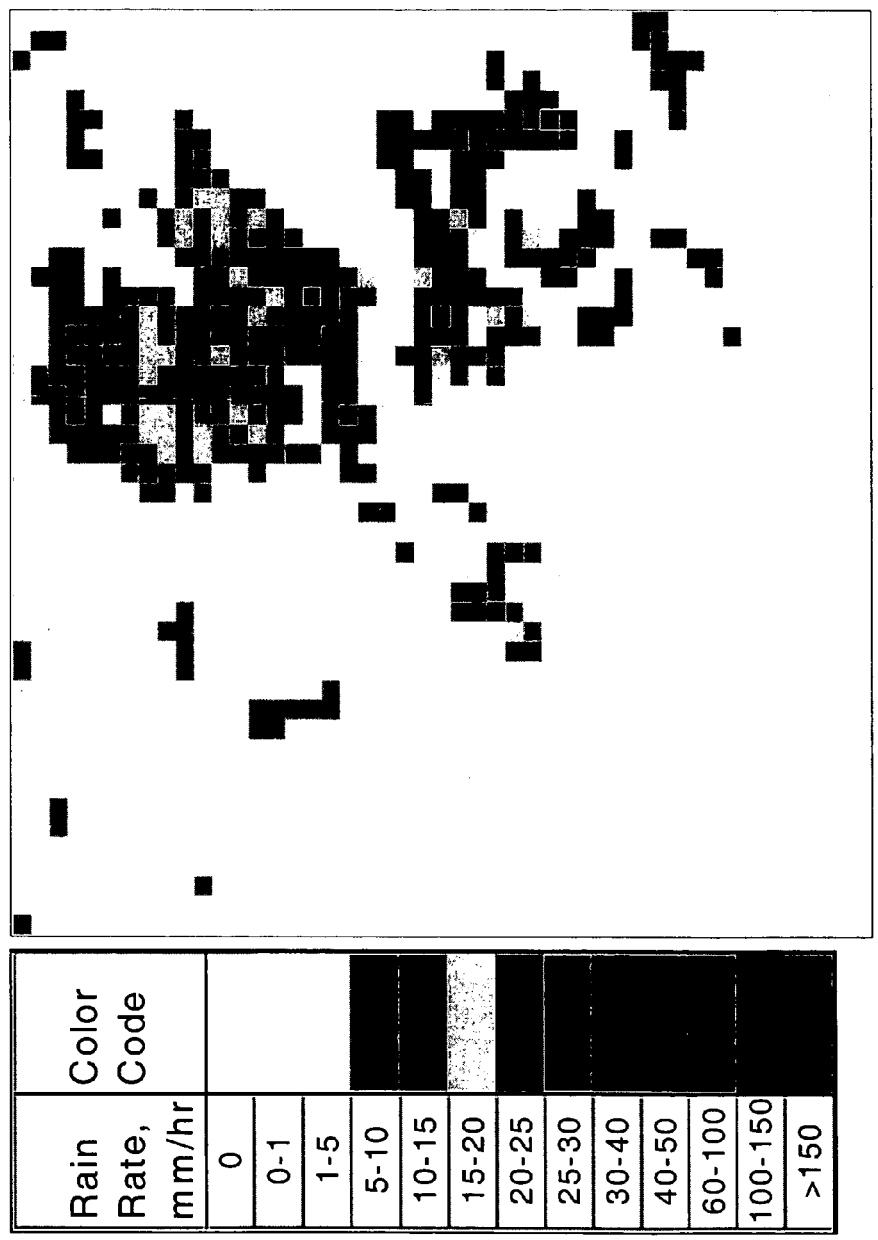
FIG. 7 is a graph of rain rate distributions.

Note that there are several periods of time where the attenuation is in excess of 35 dB. For this time period we used the methodology above to compute the capacity each 15 minutes and the results are shown in FIG. 6. The second curve shows the percentage of the beam area actually affected by rain. FIG. 7 shows the rain rate distribution at the particular moment when the maximum percentage of the beam area is being affected by rain. Notice that during this severe rain storm, as recorded at the receiver in Reston, there is intense variation in the rain throughout the region. So it is not very surprising that the period of lowest beam capacity is not necessarily the period of most rain at a particular point in the beam.

The lowest value of capacity calculated during this several hour period is approximately 45%. Now the fact that the signal degradation at the single receiver in Reston was the worst we could find for a several hour period over the 5 year data period does not guarantee that 45% was the lowest the capacity would reach over the 5 year period. But we think it's clear that it can't be far wrong. Similar calculations we have made for other periods when there was significant rain degradation at Reston showed much lower capacity reductions.

Systems, apparatus, and methods of handling downlink traffic in an Internet access system incorporating rain burden-sharing have been disclosed. The systems and methods combine time division multiplex, variable rate coding over large dynamic range with appropriate feedback from user devices to a hub reporting received SNR. The system process compensates users of lowered data rate with increased portions of time on the channel. The effects of rain burden sharing, as rain passes through a beam, is as a decrease of capacity of the beam but substantially all users receiving exactly the same quality of service. If the beam is fully loaded with subscribers and the capacity decrease occurs during the busy hour, this capacity decrease will correspond to a downlink transfer rate reduction for all subscribers. But this decrease is very small compared to the worst affected users of a hypothetical system that uses variable rate but does not compensate lower rate with greater transmission time.

A rain burden sharing approach can be configured to provide margins of around 15 dB. It is impractical for a brute force power margin approach to provide power margins of numbers like 15 dB. Even if it were possible, providing 30× the power needed with no rain in order to provide for the 1 to 2% of the time the beam has any rain in it seems uneconomic. The rain burden sharing technique disclosed above is a practical way to overcome the rain problem in the Ka band links.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A computer implemented method, comprising:
   determining a rain attenuation for a device associated with a buffer of buffers of a gateway;
   modifying a size of the buffer based on an amount of information to be transmitted from the gateway to at least one satellite;
   buffering one or more portions of the information in the buffer;
   successively accessing the one or more portions from the buffer for one or more respective durations in a round robin manner based on the rain attenuation; and
   transmitting the one or more portions from the gateway to the at least one satellite based on the round robin manner.

2. The computer implemented method of claim 1, wherein the successively accessing further comprises retrieving an equivalent number of data bits for devices including the device coupled to the gateway in response to a number of the devices.

3. The computer implemented method of claim 1, further comprising:
   receiving a Ka band satellite signal from the device;
   deriving a signal metric from the Ka band satellite signal;
   determining a coding rate for data associated with the device based on the signal metric;
   encoding the data yielding encoded data based on the coding rate; and
   transmitting the encoded data from the gateway to the at least one satellite based on the round robin manner.

4. The computer implemented method of claim 3, wherein the deriving further comprises deriving a Signal to Noise Ratio (SNR) from the Ka band satellite signal.

5. The computer implemented method of claim 3, wherein the deriving the signal metric further comprises deriving a data error rate from the Ka band satellite signal.

6. The computer implemented method of claim 3, further comprising:
   first determining a time slot that is inversely proportional to the coding rate; and
   second transmitting the encoded data from the gateway to the at least one satellite during the time slot.

7. The computer implemented method of claim 1, wherein the modifying further comprises:
   increasing the size of the buffer in response to the device connecting to a satellite based network associated with the gateway; and
   decreasing the size of the buffer in response to the device disconnecting from the satellite based network.

8. The computer implemented method of claim 1, further comprising:
   receiving, at the gateway, a signal metric associated with information transmitted to a wireless device;
   computing a coding rate of transmit data associated with the wireless device based on the signal metric;
   encoding a result of the retrieving based on the coding rate; and
   wirelessly transmitting a first result of the encoding from the gateway to the at least one satellite based on the round robin manner.

9. The computer implemented method of claim 1, wherein the buffering the one or more portions further includes:
   determining a coding rate for the device based on the rain attenuation; and
   buffering the one or more portions of the information in the buffer based on the coding rate.

10. The computer implemented method of claim 1, further comprising:
    receiving a signal metric from the device, wherein the determining the rain attenuation further includes determining the rain attenuation for the device based on the signal metric.

11. The computer implemented method of claim 1, further comprising:
    determining a rise in a noise temperature for the device, wherein the successively accessing the one or more portions further includes accessing the one or more portions from the buffer based on the rise in the noise temperature.

12. A computer implemented method, comprising:
    determining rain degradation for devices associated with respective buffers of a gateway;
    allocating a size of a buffer of the respective buffers based on an amount of data to be transmitted from the gateway to at least one satellite;
    storing the data in the buffer, wherein the data corresponds to a device of the devices that is coupled to the gateway;
    retrieving the data from the respective buffer in a round robin manner for a time according to the rain degradation; and
    transmitting the data from the gateway to the at least one satellite in the round robin manner.

13. The computer implemented method of claim 12, further comprising:
    increasing the size of the buffer in response to the device connecting to a satellite network associated with the gateway; and
    decreasing the size of the buffer in response to the device disconnecting from the satellite network.

14. The computer implemented method of claim 12, wherein the retrieving the data further comprises:
    accessing the buffer in response to a priority of the device; and
    first transmitting the data from the gateway to the at least one satellite based on the priority.

15. The computer implemented method of claim 12, further comprising:
    receiving a Ka band satellite signal from the device;
    computing a signal metric based on the Ka band satellite signal;
    encoding the data based on the signal metric; and
    first transmitting the data from the gateway to the at least one satellite in the round robin manner.

16. A satellite gateway, comprising:
    a plurality of buffers configured to store data corresponding to wireless devices;
    a coder configured to:
      determine a rain attenuation associated with a device corresponding to a buffer of the plurality of buffers;
      successively retrieve data from the buffer in a round robin manner for a respective period based on the rain attenuation; and
      modify a size of the buffer as a function of an amount of information that is queued for transmitting from the satellite gateway to one or more satellites; and
    a transmitter configured to:
      transmit the information from the satellite gateway to the one or more satellites via one or more Ka band satellite signals in the round robin manner.

17. The satellite gateway of claim 16, wherein the coder is further configured to:

increase the size of the buffer in response to a wireless device of the wireless devices connecting to a satellite network; and decrease the size of the buffer in response to the wireless device disconnecting from the satellite network.

18. The satellite gateway of claim 16, further comprising:
a rate control module configured to:
receive one or more signals from a wireless device of the wireless devices;
extract a signal metric based on the one or more signals;
compute a coding rate based on the signal metric; and
encode at least a portion of the information according to the coding rate.

19. The satellite gateway of claim 18, wherein the rate control module is further configured to:
employ symbol repetition for a predetermined range of signal metric values to encode the at least the portion of the information according to the coding rate.

20. The satellite gateway of claim 18, wherein the rate control module is further configured to:
extract a signal to noise ratio (SNR) from the one or more signals; and
compute the coding rate based on the SNR.

21. The satellite gateway of claim 18, wherein the rate control module is further configured to:
extract a data error rate from the one or more signals; and
compute the coding rate based on the data error rate.

22. One or more storage devices configured to store one or more instructions that, in response to execution by one or more processors, cause the one or more processors to perform operations comprising:
buffering data in a plurality of buffers of a satellite gateway, that are associated with respective devices;
modifying a size of a buffer of the plurality of buffers based on an amount of information of the data that is queued for transmitting from the satellite gateway to one or more satellites;
successively retrieving the data from the buffers in a round robin fashion for respective durations based on respective rain attenuations associated with the respective devices; and
transmitting the data from the satellite gateway to the one or more satellites in the round robin fashion.

23. The one or more storage devices of claim 22, wherein the operations further comprise:
first determining a coding rate based on a result of the buffering;
encoding the result of the buffering based on, at least in part, the coding rate;
second determining a time slot that is inversely proportional to the coding rate; and
first transmitting, during the time slot, a first result of the encoding from the satellite gateway to a satellite of the one or more satellites.

24. A system comprising:
means for modifying a size of a buffer of a plurality of buffers of a satellite gateway based on an amount of information queued for transmitting from the satellite gateway to one or more satellites;
means for queuing the information using the plurality of buffers;
means for retrieving the information from the plurality of buffers in a round robin manner based on a rain attenuation associated with a wireless device coupled to the satellite gateway; and
means for wirelessly transmitting the information from the satellite gateway to at least one satellite of the one or more satellites based on, at least in part, the round robin manner.

25. The system of claim 24, further comprising:
means for retrieving an equivalent number of data bits from the plurality of buffers in response to a number of wireless devices coupled to the satellite gateway.

26. The system of claim 24, wherein the means for queuing the information further comprises:
means for increasing the size of the buffer in response to a wireless device connecting to a satellite based network; and
means for decreasing the size of the buffer in response to the wireless device disconnecting from the satellite based network.

* * * * *